US006460237B1

(12) United States Patent
Tsiguloff

(10) Patent No.: US 6,460,237 B1
(45) Date of Patent: Oct. 8, 2002

(54) APPARATUS FOR FITTING GRIPS TO SHAFTS

(76) Inventor: Todd Tsiguloff, 8725 Waterwood Ct., Fort Wayne, IN (US) 46804

( * ) Notice: Subject to any disclaimer, the term of this patent is extended or adjusted under 35 U.S.C. 154(b) by 0 days.

(21) Appl. No.: 09/782,429

(22) Filed: Feb. 13, 2001

(51) Int. Cl.[7] .................................................. B23P 19/02
(52) U.S. Cl. ............................. 29/235; 29/255; 29/263; 29/281.5; 29/280
(58) Field of Search ................................ 29/235, 426.5, 29/720, 255, 261, 263, 280, 271, 281.5

(56) References Cited

U.S. PATENT DOCUMENTS

| | | | |
|---|---|---|---|
| 4,134,198 | 1/1979 | Briggs | |
| 4,677,872 | 7/1987 | Nishida et al. | |
| 4,783,893 | * 11/1988 | Farino | 29/426.5 |
| 4,899,428 | 2/1990 | Hsu | |
| 5,407,026 | 4/1995 | Vald'via | |
| 5,429,706 | 7/1995 | Cresse et al. | |
| 5,765,758 | 6/1998 | Chu | |
| 5,909,912 | 6/1999 | Mueller | |
| 6,245,178 | 6/2001 | Lenhof et al. | |
| 6,279,637 | 8/2001 | Lenhof et al. | |
| 6,298,546 | * 10/2001 | Slota | 29/270 |

* cited by examiner

*Primary Examiner*—Joseph J. Hail, III
*Assistant Examiner*—Lee Wilson
(74) *Attorney, Agent, or Firm*—O'Malley and Firestone

(57) ABSTRACT

An apparatus for radially expanding an elastic handgrip on its axis of elongation to allow easier introduction of a shaft to the elastic handgrip by an open end of the shaft. The main body of apparatus provides a two section element which includes a cradle revealed by opening the element which is shaped to receive an elastic handgrip. A ventilation probe extends from the cradle to penetrate the elastic handgrip away from its open end upon positioning of the elastic handgrip in the cradle. The second section of the main body is a cradle closure. positionable on the cradle, for substantially enclosing an elastic handgrip disposed therein except in an area immediately surrounding the open end of the elastic handgrip. A muzzle fits around a shaft and is positionable over the cradle and cradle closure for stretching the handgrip adjacent the open end of the hand grip over a shaft.

12 Claims, 7 Drawing Sheets

APPARATUS FOR FITTING GRIPS TO SHAFTS

BACKGROUND OF THE INVENTION

The present invention relates generally to golf club assembly and maintenance and, more particularly, to an apparatus for fitting a handgrip over and onto a free end of a golf club shaft.

A golf club has a shaft with a club head at one, lower end and a handgrip at the opposite free end of the shaft. The shaft is a straight, elongated rod or tube fabricated from a suitable material. Contemporary shafts are typically made from an aluminum or steel alloy, or a graphite composite. The typical handgrip is a hollow tube open at one end and usually substantially closed at the other end except for a small vent. The handgrip is usually made from an elastomeric material which can be stretched, with difficulty, over the free end of the shaft for installation onto the shaft. The vent allows air to escape from the handgrip during fitting of the grip on the shaft.

During normal use of a golf club the handgrip deteriorates and so must be replaced. usually several times. during the useful life of the golf club. Fitting a new handgrip as a replacement rip on an old club involves stripping the old grip from the free end of the club shaft. cleaning the shaft of adhesive used to bind grips to the shaft, preparing the shaft to receive a new grip and then fitting the new grip over the free end of the shaft. Preparing the shaft for a new grip may involve application of fresh adhesive to the shaft, which sometimes includes wrapping the shaft with double sided adhesive tape. The tape is soaked with solvent to soften it and to allow grip to slide. The new handgrip then must be pulled down onto the shaft or the shaft end inserted into the grip.

The handgrip itself is usually made so that in a unstretched condition it has a slightly smaller interior diameter than the outside diameter of the shaft end to which it is to be fitted. This necessitates stretching the grip to fit the grip onto a shaft. If tape has been wound on the shaft pulling the grip down over the shaft can result in localized contact between the interior of the grip and the tape and in pulling the tape apart in areas where the winds of the tape overlap. This can result in the wind of the tape becoming locally stretched or bunched up, producing a feeling in users of the club of an uneven grip. The presence of wound tape on a shaft exaggerates the problem of evenly fitting new handgrip to a shaft so that the grip exhibits a good feel to the user and is highly stable in its position.

Numerous patents have been issued directed to the problem of fitting grips to golf club shafts. Several references have dealt with methods of using air pressure, either as a vacuum applied around the exterior of the grip, or as over pressure inside the grip, to expand the grip sufficiently to allow it to be easily slipped over the free end of a shaft. The air pressure can then be released to allow the grip to contract around the shaft.

U.S. Pat. No. 5,429,706 to Cresse et al., illustrates one use of compressed air to inflate and thereby swell a handgrip allowing shaft and grip to be easily mated. Cresse et al., observes that the closed end of a handgrip typically has a small orifice. Where no orifice exists one can be easily pierced. Cresse et al. supply a support body 94 which has a nipple insertable through the orifice from outside of the grip. Air under pressure is introduced to the inside of the grip through the nipple after first introducing the shaft sufficiently to seal the interior of the grip.

SUMMARY

An object of the invention is to provide a handgrip fitting apparatus suitable for home use. allowing employment of commonly used air compressors.

Another object of the invention is to provide a robust, compact and simple to use hand grip fitting die.

Still another object of the invention is to provide a mechanism which eases insertion of golf club shafts into handgrips.

Yet another object of the invention is to provide ease of removal of shafts from handgrips for repositioning.

The invention provides an apparatus for radially expanding an elastic handgrip on its axis of elongation to allow easier introduction of a shaft to the elastic handgrip by an open end of the shaft. The main body of apparatus provides a die having two sections. one of which is a cradle shaped to receive an elastic handgrip. A ventilation probe extends from the cradle to penetrate the elastic handgrip away from its open end upon positioning of the elastic handgrip in the cradle. The second section of the main body is a cradle closure. positionable on the cradle, for substantially enclosing an elastic handgrip disposed therein except in an area immediately surrounding the open end of the elastic handgrip. A muzzle fits around a shaft and is positionable over the cradle and cradle closure for steering the handgrip adjacent the open end of the hand grip over a shaft.

The invention further includes a source of compressed air and an attachment between the source of compressed air and the ventilation probe for delivering air under pressure to an interior of an elastic handgrip. The cradle and the cradle closure form a cylindrical structure when closed on one another, the cylindrical structure having a closed end and an opposite open end, from which open end an elastic handgrip may extend. Retention of the muzzle on the cylindrical structure can be handled a number of ways. One way is to provide a plurality of retaining rings around the circumference of the cylindrical structure near its open end and a plurality of spring loaded latches disposed radially inwardly in the muzzle cooperate to hold the muzzle on the cylindrical structure.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use further objects and advantages thereof, will best be understood by reference to the following detailed description of an illustrative embodiment when read in conjunction with the accompanying drawings, wherein:

DETAILED DESCRIPTION OF THE INVENTION

Figure 1:
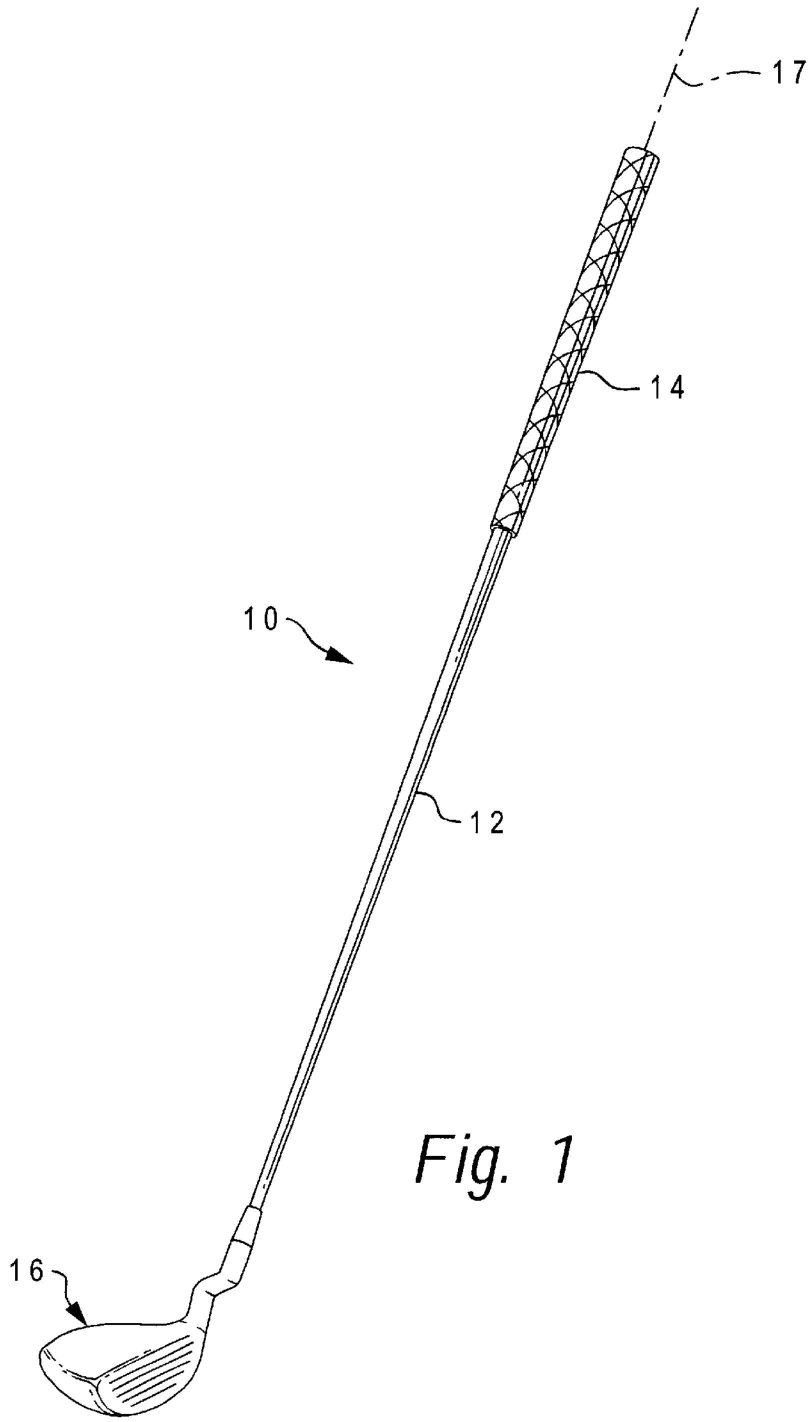
FIG. 1 is a perspective view a golf club having an elastic hand grip.

Referring now to the drawings in which a preferred embodiment of the invention is illustrated, and with reference to the manner of using the invention to apply a hand grip to a shaft, particularly the shaft of a golf club, is explained. FIG. 1 is a perspective view of a golf club 10 having a straight shaft 12. An elastic hand grip 14 is fitted over one end of shaft 14. A club head 16 is attached to the opposite end of the shaft 12 from the elastic hand grip 14. Hand grip 14 is subject to wear with use, and the consequent need for replacement. Additionally, owners of clubs may wish to shorten the shafts of clubs from older sets for children, with the need to remove and replace a handgrip 14.

Typically, handgrips have been removed and replaced professionally. An adhesive or tape used to bond the handgrip 14 to the end of shaft 12, is applied to a clean shaft and the handgrip 14 is fitted over the shaft end. Various vacuum or pressurization systems have been proposed to expand temporarily the handgrip 14 to case its fit over the end of the shaft 12. In any system, after an old grip has been removed, the shaft must be cleaned of any old material. If a shaft 12 is to be shortened, the freshly cut end of the shaft should be carefully deburred and squared with the shaft 12 center line 17. If the handgrip has a preferred rotational alignment, the shaft 12 should be marked to indicate this before use of the invention to fit a new hand grip 14. It is anticipated that shift 12 has a club head 16 attached to its opposite end, sealing that end of the shaft.

Figure 2:
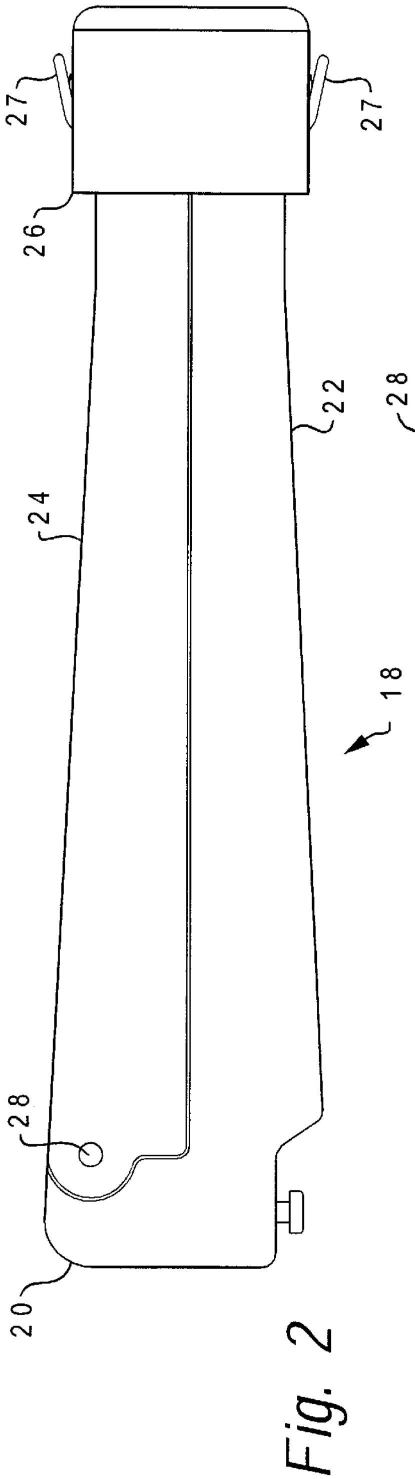
FIG. 2 is a side elevation of a hand grip die in accordance with the invention.

Referring now to FIG. 2, a grip containment die 18 is illustrated into which an elastic handgrip 14 may be placed for temporary radial expansion to allow easy introduction of a shaft. Grip containment die 18 provides for minimal expansion, under air pressure, and containment of a handgrip positioned in the die. A shaft 12 will either be in the process of insertion, or already fitted in the case that a still flexible grip is being expanded for nondestructive removal.

Grip containment die 18 includes a barrel 20, comprising two sections, a cradle section 22 and a closure section 24. A muzzle 26 is positioned over one end of the barrel 20, and is attached by latches (shown below) which are released by latch levers 27. Muzzle 26 functions as a clamping device, sealing the two sections of the barrel 20 together at one end. Near the opposite end of barrel 20 from muzzle 26 is a pivot linkage 28 connected between cradle section 22 and closure section 24 which restrains the sections against one another and allows opening the barrel upon removal of muzzle 26 from barrel 20. Upon opening, cradle section 22 and closure section 24 expose shaped surfaces which form a die cavity when the sections are closed on one another.

Figure 3:
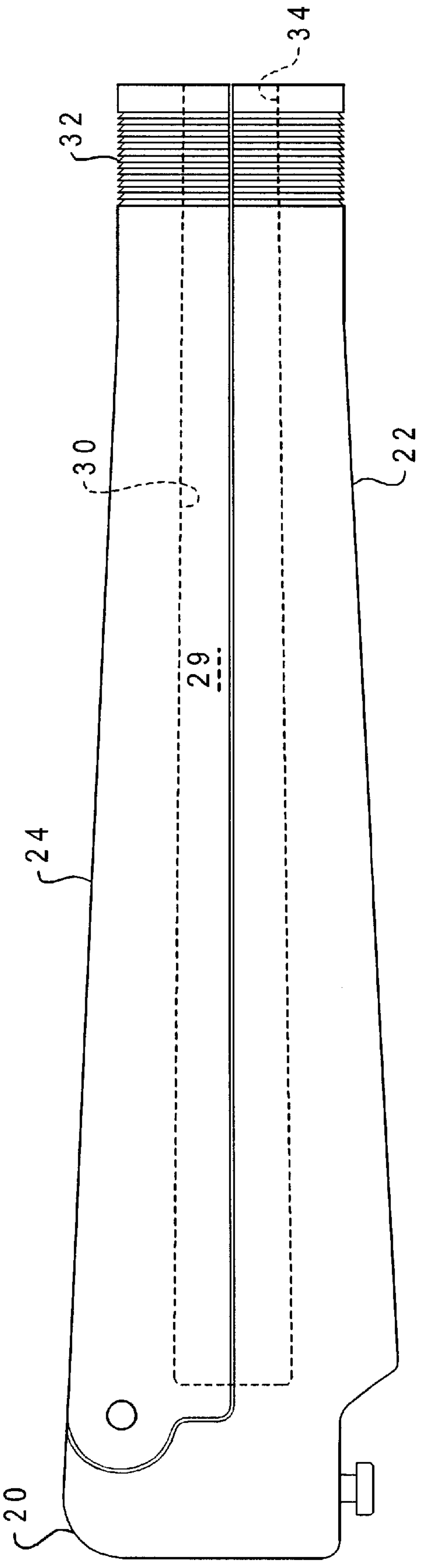
FIG. 3 is a side elevation of a barrel section of the die.

FIG. 3 illustrates the position of the die cavity 29 (shown in shadow) within barrel 20. The shaped surfaces of cradle section 22 and closure section 24 form an interior, generally cylindrical surface 30 which limits the radial expansion of any handgrip positioned in the cavity 29. The central axis of a handgrip should be aligned with the central longitudinal axis of cavity 29. Die cavity 29 has an opening 34 at the end of barrel 20 to which a muzzle or clamp is applied. The exterior surface of barrel 20 is molded to form a series of rings 32 near the muzzle end of the barrel.

Figure 4:
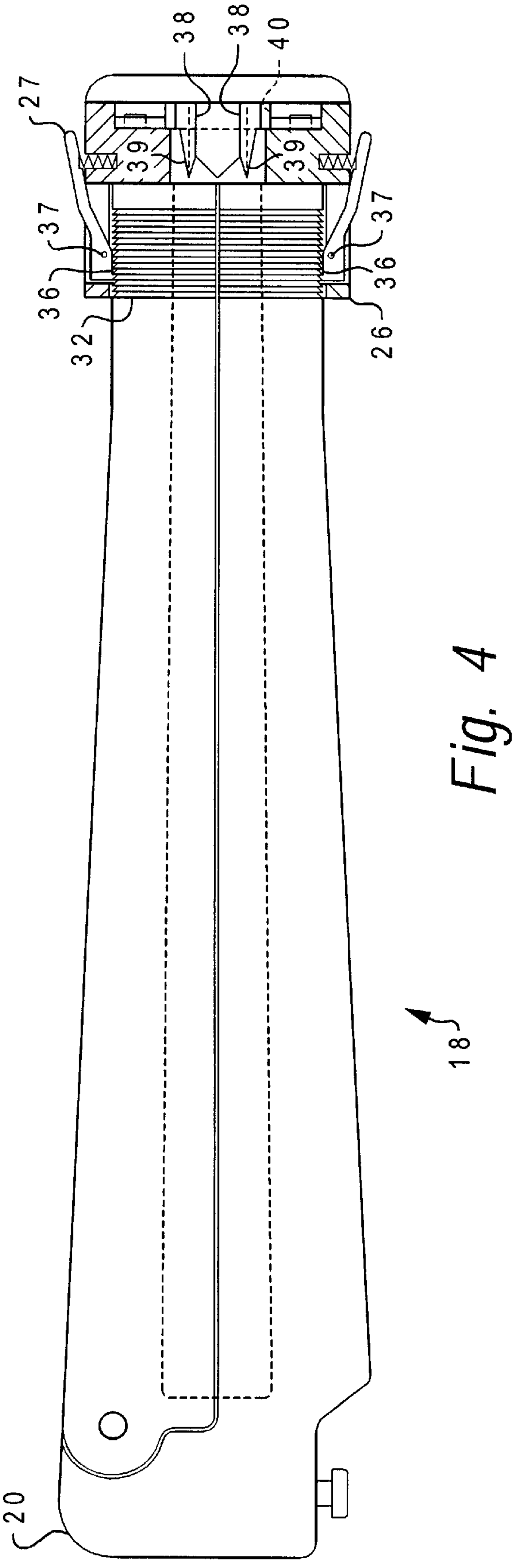
FIG. 4 illustrates the position of an internal chamber for holding a hand grip to be expanded.

FIG. 4 illustrates attachment of a muzzle or clamping device 26 to the muzzle end of barrel 20. Spring biased latches 36 are radially distributed around the central axis of muzzle 26, which is illustrated as aligned with the central axis of barrel 20 when the muzzle is mounted on the muzzle end of the barrel. Latches 36 are oriented radially inwardly and rotate on pivots 37 to move in and out of rings 32. Latches 36 engage ringes 32 and hold the muzzle 26 onto barrel 20. The bias of latches 36 is to close the latches on the rings 32. Those skilled in the art will realize that muzzle 26 may be releasably retained on barrel 20 in a number of ways and that the illustrated method is simply an example of one such one.

Muzzle 26 also includes a plurality of spring biased, radially inwardly oriented wedges piston 38, positioned adjacent a forward open end 40 of the muzzle. Pistons 38 each mount a wedge 39, which is oriented parallel to the central axis of muzzle 26 and which has an edge oriented down barrel 20 when the muzzle is positioned on the barrel. Pistons 38 and wedges 39 provided for stretching an open end of a hand grip over a shaft to ease introduction of shaft into grip.

Figure 5A:
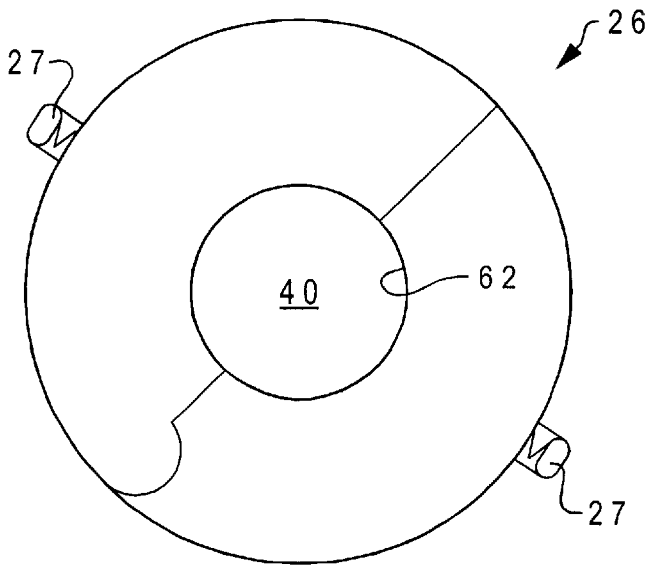
FIGS. 5A–C are a series of views illustrating a hand grip end stretching and retaining muzzle.
Figure 5B:
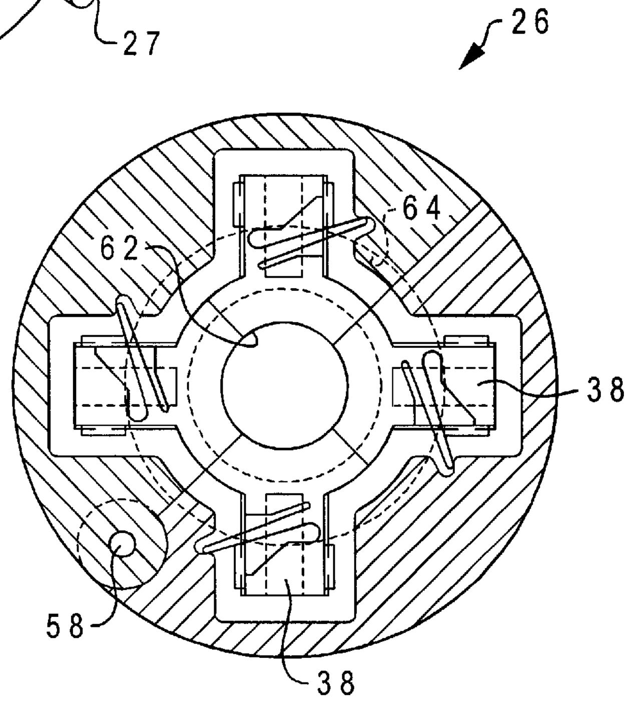
Figure 5C:
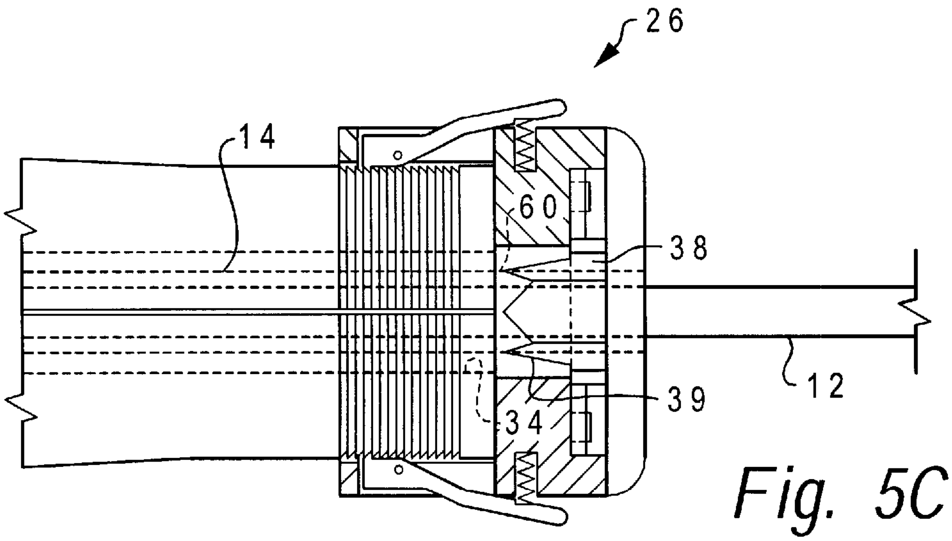

FIGS. 5A–C detail the muzzle or end clamp 26. Muzzle 26 is a two stage tube having a smaller interior diameter wedges 8 section 62 formed by pistons 38 around a shaft 12. A larger interior diameter section 64 allows the muzzle 26 to be fit over the end of barrel 20. In use, the open end 40 of muzzle 26 is oriented away from the end of barrel 20. Spring loaded pistons 38 are positioned in the muzzle 26 and are radially oriented and inwardly directed around the central axis of the muzzle.

Figure 6B:
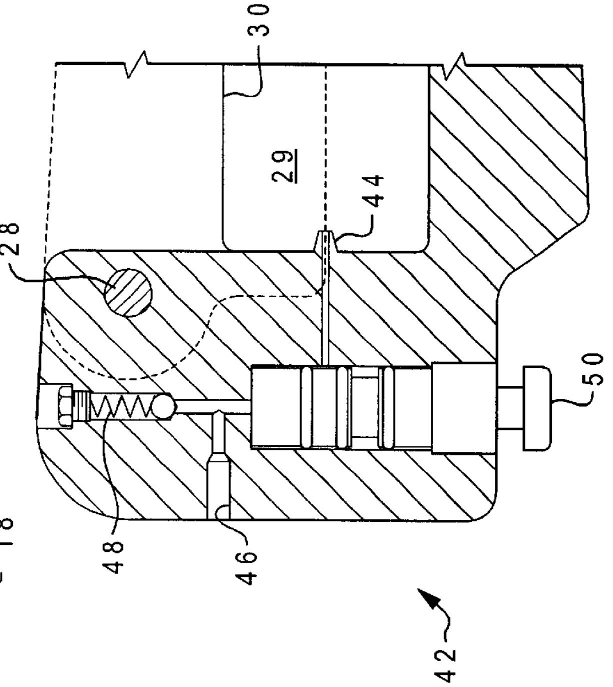
FIGS. 6A–B illustrate a ventilation path in the die.
Figure 6A:
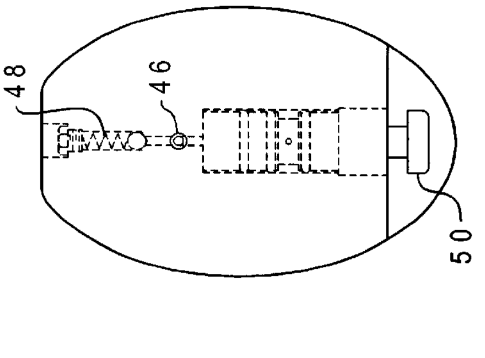

Referring now to FIGS. 6A–B, a ventilation path 42 through the cradle section 22 for inflating a hand grip positioned in die cavity 29. Ventilation path 42 comprises an inlet 46 accessible from an exterior surface of cradle section 22. Inlet 46 admits and retains a small diameter air hose used to deliver air to the die cavity 29. Ventilation path 42 includes a spring biased pressure relief valve 48. Pressure relief valve 48 may be adjusted to control the spring bias. Actuation of the device is controlled by a button valve 50. which is depressed to open an air path from inlet 46 to probe 44. Ventilation path 42 terminates within cavity 29 through an inflation probe 44, which is sized to fit into a ventilation hole commonly provided in the heal or base of a golf club hand grip.

Figure 7:
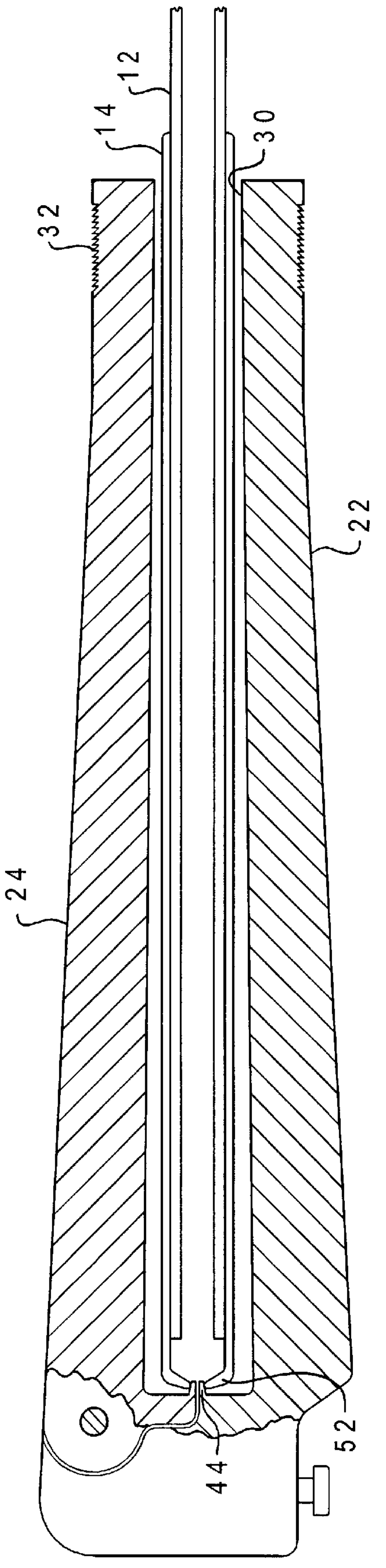
FIG. 7 is a side elevation of an opened cylinder illustrating, positioning of a hand grip therein.

FIG. 7 illustrates opening of barrel 20 to allow positioning of a hand grip 14 in the barrel. The hand grip 14 is initially placed in the cradle section 22 leaving a short section of the end of the grip adjacent its open end extending beyond the end of the cradle section. The closure section 24 may then be lowered onto the cradle section 22 to capture the hand grip 14 in a cavity formed between the sections of the barrel 20.

Figure 8:
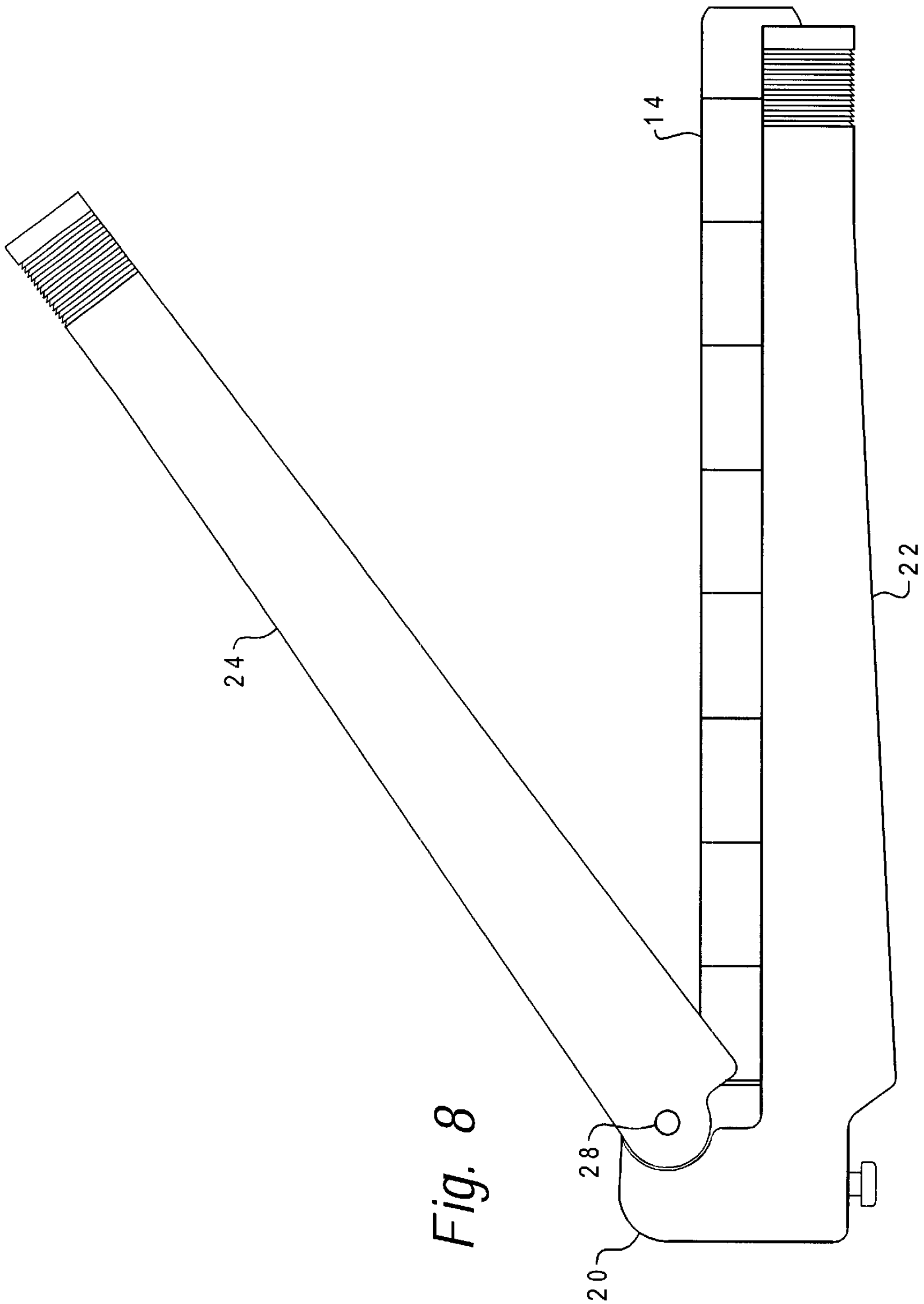
FIG. 8 is a cutaway view illustrating disposition of a hand grip and an end of a shaft disposed within the hand grip expansion chamber.

FIG. 8 illustrates in cross sectional view operation of the invention on a hand grip 14 positioned within the cavity 29 formed by interior cylindrical wall 30. Hand grip 14 has been positioned onto a golf club shaft 12 and adheres thereto by virtue of glue or elastomeric compression or both. Inlet 44 extends into inlet 52 formed in the otherwise closed end of hand grip 14. Air is introduced to the interior of the hand grip 14 to radially expand the hand grip outwardly against the interior cylindrical wall 30. An adhesive may have been applied to the shaft or to the interior before introduction of the shaft to the grip. Air flow is initiated and the shaft 12 is introduced to the open end of the grip 14. As the shaft is introduced to the grip, air flow may be periodically interrupted during movement of the shaft fully into the grip and to allow pressure to rebuild if flow is too great, allowing pressure drop and grip contraction.

Figure 9:
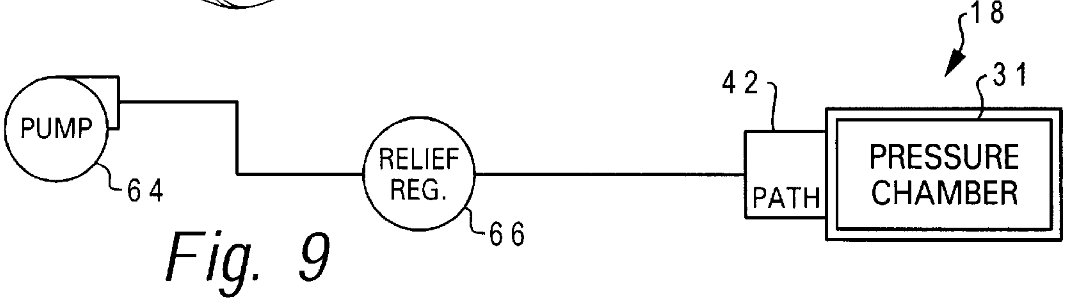
FIG. 9 is a schematic illustration of the external elements of an hand grip inflation circuit.

FIG. 9 is a schematic illustration of connection of the hand grip die 18 to a pressurization source. A pump 64 or other source of compressed air is connected through a hose to ventilation path 42 into a pressure chamber 31 formed by hand grip 14 on shaft 12.

The grip containment die of the present invention allows home users to alternately install and remove grips on shafts. Individuals wishing to try several grips on a shaft can readily install and remove grips to meet personal preference. The use of common sources of compressed air, such as small automotive compressors or bottled compressed gas makes the invention particularly convenient for home users.

While the invention is shown in only one of its forms, it is not thus limited but is susceptible to various changes and modifications without departing from the spirit and scope of the invention.

What is claimed is:

1. An apparatus for installing a grip on a shaft, the apparatus comprising:

first and second die sections, the first die section having a cradle formed on one surface thereof for receiving a grip;

a pivot coupling between the first and second die sections allowing the die sections to be closed on one another to form a die;

a chamber including the cradle formed in the die;

an opening to the chamber from outside of the die to admit an end of a shaft to the chamber; and a ventilation path through the first die section including an inflation probe extending into the cradle for introduction into a grip positioned in the cradle.

2. The apparatus as set forth in claim 1, the ventilation path further comprising:

an external attachment point on the first die section communicating with the ventilation path for connection to a source of compressed air.

3.The apparatus as claimed in claim 2, further comprising:

an external muzzle fitable over the die, the external muzzle having a circular opening fitable around the shaft and axially aligned upon fitting of the external muzzle over the die with the opening to the chamber.

4. The apparatus as claimed in claim 3, the external muzzle further comprising:

a pair of outwardly opposed surfaces;

first and second muzzle sections which fit together to define the circular opening in one of the pair of outwardly opposed surfaces and which allow the circular opening to be fitted to a shaft;

a mouth opening out on the remaining one of the pair of outwardly opposed surfaces, which is axially aligned with the circular opening and which fits over the die; and biased pincers positioned with the external muzzle between the mouth and the circular opening for clamping a grip extending outwardly from the opening to the chamber to a shaft.

5. The apparatus as claimed in claim 4, further comprising:

retaining means between the die and the external muzzle for releasably holding the external muzzle on the die.

6. The apparatus as claimed in claim 5, further comprising:

a source of compressed air;

a pressure line connecting the source of compressed air to the ventilation path;

a pressure regulator connected to the pressure line between the source of compressed air and the ventilation path; and a cut off valve connected in the pressure line between the source of compressed air and the ventilation path.

7. The apparatus as claimed in claim 6, further comprising:

a source of compressed air, and a pressure line connecting the source of compressed air to the ventilation path;

a cut off valve connected in the pressure line between the source of compressed air and the ventilation path.

8. An apparatus for radially expanding an elastic handgrip on its axis of elongation to allow easier introduction of a shaft to the elastic handgrip by an open end of the shaft, the apparatus comprising:

a cradle shaped to receive an elastic handgrip;

a ventilation probe extending from the cradle to penetrate an elastic handgrip away from its open end upon positioning of the elastic handgrip in the cradle;

a cradle closure positionable on the cradle for substantially enclosing an elastic handgrip disposed therein except in an area immediately surrounding the open end of the elastic handgrip; and a muzzle fitting around the shaft and positionable over the cradle and cradle closure for pressing the handgrip adjacent the open end of the hand grip onto a shaft.

9. The apparatus as set forth in claim 8, further comprising:

a source of compressed air; and an attachment between the source of compressed air and the ventilation probe for delivering air under pressure to an interior of an elastic handgrip.

10. The apparatus as set forth in claim 9, further comprising:

a pivot linkage connected between the cradle and the cradle closure; and the cradle and the cradle closure forming a cylindrical structure when closed on one another, the cylindrical structure having a closed end and an opposite open end, from which open end an elastic handgrip may extend.

11. The apparatus as set forth in claim 10, further comprising:

a plurality of retaining rings around the circumference of the cylindrical structure near the open end; and a plurality of spring loaded latches disposed radially inwardly in the muzzle for cooperation with the retaining rings to releasably hold the muzzle on the cylindrical structure.

12. The apparatus as set forth in claim 11, wherein the attachment includes a pressure relief valve and a cutoff valve.

* * * * *